United States Patent
Nohl et al.

(10) Patent No.: US 10,649,082 B2
(45) Date of Patent: May 12, 2020

(54) DEVICE FOR WARNING A VEHICLE DRIVER OF A VEHICLE ABOUT AN OBJECT, AND VEHICLE HAVING SUCH A DEVICE

(71) Applicant: KNORR-BREMSE SYSTEME FUER NUTZFAHRZEUGE GMBH, Munich (DE)

(72) Inventors: Andreas Nohl, Gaeufelden (DE); Ulrich Guecker, Schwieberdingen (DE); Jochen Banspach, Helmstadt-Bargen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/330,220

(22) PCT Filed: Aug. 16, 2017

(86) PCT No.: PCT/EP2017/070770
§ 371 (c)(1),
(2) Date: Mar. 4, 2019

(87) PCT Pub. No.: WO2018/046266
PCT Pub. Date: Mar. 15, 2018

(65) Prior Publication Data
US 2019/0225150 A1 Jul. 25, 2019

(30) Foreign Application Priority Data
Sep. 9, 2016 (DE) .................. 10 2016 116 963

(51) Int. Cl.
*G01S 13/93* (2020.01)
*G01S 13/931* (2020.01)
(Continued)

(52) U.S. Cl.
CPC .............. *G01S 13/93* (2013.01); *B60Q 9/008* (2013.01); *G01S 13/58* (2013.01); *G01S 13/931* (2013.01); *G01S 2013/9332* (2013.01)

(58) Field of Classification Search
CPC ........ G01S 13/50; G01S 13/505; G01S 13/52; G01S 13/536; G01S 13/58; G01S 13/588;
(Continued)

(56) References Cited

U.S. PATENT DOCUMENTS

| 4,926,171 A * | 5/1990 | Kelley .................... G01S 13/86 340/961 |
| 7,359,782 B2 * | 4/2008 | Breed ................. B60R 21/0134 701/45 |

(Continued)

FOREIGN PATENT DOCUMENTS

| DE | 19654691 A1 | 7/1997 |
| DE | 102007050962 A1 | 4/2009 |

(Continued)

OTHER PUBLICATIONS

International Search Report dated Dec. 5, 2017, of the corresponding International Application PCT/EP2017/070770 filed Aug. 16, 2017.

*Primary Examiner* — Van T Trieu
(74) *Attorney, Agent, or Firm* — Norton Rose Fulbright US LLP; Gerard Messina (57) ABSTRACT

An apparatus for warning a vehicle driver about an object, including: a) a sensor device having a detection area (DA) extending from a front DA, in front of a vehicle, including the front DA, to a rear end of a side DA, laterally from one vehicle side and whose length corresponds to no more than the vehicle length, the sensor device detecting an object, b) a control device to evaluate the sensor signals for objects and defines a warning area (WA) that is dynamically alterable (DyA) based on the vehicle speed, the WA being alterable
(Continued)

within the side DA between a non-zero minimum/maximum WA, c) a warning device generating a warning signal for a detected object, d) the sensor device being such that the DA continues from the side DA into a rear DA behind the vehicle rear, including the rear DA, e) the control device expanding the DyA WA.

20 Claims, 6 Drawing Sheets

(51) Int. Cl.
*G01S 13/58* (2006.01)
*B60Q 9/00* (2006.01)

(58) Field of Classification Search
CPC ...... G01S 13/589; G01S 13/93; G01S 13/931; G01S 13/9314; G01S 13/9325; G01S 19/9321; B60Q 9/00; B60Q 9/008; B60T 2201/34
See application file for complete search history.

(56) References Cited

U.S. PATENT DOCUMENTS

| | | | |
|---|---|---|---|
| 7,783,403 B2* | 8/2010 | Breed | B60R 21/0134 340/435 |
| 2009/0009306 A1 | 1/2009 | Magane et al. | |
| 2009/0207069 A1* | 8/2009 | Kearney | G01S 13/60 342/104 |
| 2019/0202455 A1* | 7/2019 | Guecker | B60W 10/18 |
| 2019/0212439 A1* | 7/2019 | Nohl | B60T 8/17558 |

FOREIGN PATENT DOCUMENTS

| | | |
|---|---|---|
| DE | 102009041555 A1 | 6/2010 |
| DE | 102011116822 A1 | 4/2013 |
| DE | 102013018543 A1 | 5/2015 |
| DE | 102013224954 A1 | 6/2015 |

* cited by examiner

DEVICE FOR WARNING A VEHICLE DRIVER OF A VEHICLE ABOUT AN OBJECT, AND VEHICLE HAVING SUCH A DEVICE

FIELD OF THE INVENTION

The invention relates to an apparatus for warning a vehicle driver of a vehicle about an object and to a vehicle having such an apparatus.

BACKGROUND INFORMATION

With such warning apparatuses, it is desirable for warnings about the objects detected by the sensor device to be given only if this is also actually appropriate in view of the driving situation, because otherwise unnecessarily frequent generation of warning signals means that the driver's acceptance of the apparatus is reduced.

An apparatus of the type in question is discussed in DE 10 2009 041 555 A1, for example. This document describes dynamic range limiting for the detection area for a turning assist system and a blind spot assist system. In particular, it describes a lateral warning area that is dynamically alterable on the basis of the speed of the vehicle as seen in a direction perpendicular to a vehicle side. The dynamic lateral warning area extends between a non-zero lateral minimum distance (0.4 meter) and a maximum distance (2.5 meters) from the vehicle. A warning signal is then generated only if there is a stationary or moving object within the dynamic lateral warning area.

SUMMARY OF THE INVENTION

The present invention is by contrast based on the object of developing an apparatus of the type described above further such that on the one hand no unnecessary warning signals are generated but on the other hand there is a high level of safety in the face of critical situations. Furthermore, the aim is also to provide a vehicle having such an apparatus.

This object may be achieved by the features as described herein.

A first aspect of the invention sets out from an apparatus for warning a vehicle driver of a vehicle about an object, containing at least the following:
a) a sensor device having a detection area may extend without gaps at least from a front detection area, arranged in front of a vehicle front, including the front detection area, to a rear end of a side detection area, arranged laterally from one vehicle side and whose length corresponds to no more than the length of the vehicle, wherein the sensor device detects an object stationary or moving within the detection area,
b) a control device interacting with the sensor device and configured so that it evaluates the signals of the sensor device for objects stationary or moving within the detection area and defines a warning area that is dynamically alterable at least on the basis of the speed of the vehicle, said warning area being alterable within the side detection area between a non-zero minimum warning area and a maximum warning area, as seen perpendicular to a longitudinal centerline of the vehicle, wherein the dynamically alterable warning area is smaller than or the same as the detection area,
c) a warning device actuated by the control device such that it generates a warning signal to warn the vehicle driver only when the sensor device detects an object in the dynamically alterable warning area.

In other words, the warning area is then altered only in a lateral direction, whereas it remains constant as seen in the direction of the longitudinal centerline of the vehicle and is limited for example to the length of the vehicle or of the vehicle/trailer combination.

According to the first aspect, there is provision, according to the invention, that
d) the sensor device is furthermore arranged and configured such that the detection area continues, which may be without gaps, from the side detection area into a rear detection area behind the vehicle rear, and that
e) the control device is furthermore configured so that it expands the dynamically alterable warning area, as seen in the direction of the longitudinal centerline of the vehicle,
e1) into the rear detection area if the sensor device detects an object in the rear detection area, and/or expands it into the front detection area if the sensor device detects an object in the front detection area, if
e2) the sensor device detects that the vehicle and the object are moving toward one another.

Feature e2) thus produces the prerequisite that one of the alternatives or both alternatives in feature e1) can occur.

Accordingly, it is also possible, according to the invention, to take into consideration situations in which an object moves substantially in the same direction as the vehicle, i.e. the trajectory of the object is for example parallel to the longitudinal centerline of the vehicle and the object is situated or moves not just laterally from the vehicle but additionally also either in front of the front surface or behind the rear surface of the vehicle; furthermore, also situations in which the object is stationary and the traveling vehicle moves toward the object from in front or behind.

The vehicle and the object moving toward one another means that a relative movement takes place between the vehicle and the object, so that the distance between the vehicle and the object changes over time.

An object moving toward the vehicle from behind relative to the vehicle is for example a moving object that moves for example in the same direction of travel as the vehicle but is at a greater speed than the vehicle, e.g. a cyclist approaching the stationary vehicle from behind in order to overtake the vehicle on the right, for example. Equally, however, it is also possible for the vehicle to reverse toward a stationary or moving object detected in the rear detection area by the sensor device if the speed of the vehicle is greater than that of the object.

Conversely, an object moving toward the vehicle from in front relative to the vehicle can be for example an object moving in the same direction of travel as the vehicle but having a lower speed than the vehicle, a stationary object or a moving object.

The widening, according to the invention, of the dynamically alterable warning area in the front and/or rear area warns the driver, by warning signals, about objects approaching the vehicle from behind or from in front, relative to the vehicle, but not yet situated in the minimum warning area A_info_min arranged within the side detection area, but being expected to be there soon, before his actual intended turning in the direction of the monitored side surface of the vehicle. The reason is that specifically such objects carry the risk of being overlooked by the driver when turning the vehicle, and a collision then occurring. As, in such a situation, the dynamically alterable warning area is generated by the control device in a size large enough to also be able to detect such objects so as then to generate a warning signal, the invention according to the first aspect contributes to increasing safety in particular when turning.

The dynamically alterable warning area may become smaller as the speed of the vehicle decreases, with the minimum warning area being a lower limit. The background is that at a relatively low speed e.g. in city traffic and given a relatively large warning area owing to the numerous objects normally present e.g. at a junction, a correspondingly large number of warning signals would be generated that would overwhelm the vehicle driver. A warning area that is then smaller then ensures that the number of warning signals is advantageously reduced. Conversely, which may be the dynamically alterable warning area becomes larger as the speed of the vehicle increases, with the maximum warning area e.g. in the form of the detection area being an upper limit.

The measures set out in the subclaims allow advantageous developments and improvements of the first aspect of the invention.

According to an embodiment of the first aspect, the control device can be configured so that it can receive signals representing an actual or intended turning of the vehicle and laterally widens the dynamically alterable warning area, as seen transversely with respect to the direction of travel or the longitudinal centerline of the vehicle, on the vehicle side toward which the turning of the vehicle actually takes place or is intended. In that case, as already set out in detail above, safety when turning the vehicle is increased.

According to one development of the first aspect, the side detection area of the detection area is arranged laterally from the vehicle side that is the vehicle side facing away from a driver's seat of the vehicle. It is then possible to avoid critical situations particularly for left-hand control vehicles when turning right. Alternatively, the side detection area of the detection area can also be arranged laterally from the vehicle side that is the vehicle side facing the driver's seat of the vehicle. In that case, it is possible to avoid critical situations particularly when turning left.

According to one development of the first aspect, the control device defines the dynamically alterable warning area on the basis of the speed of the vehicle, the speed of a detected object, the relative speed between the vehicle and the detected object, the distance between the vehicle and the detected object and on the basis of the geometry of the vehicle.

According to one development of the first aspect, the warning device can be configured so that it generates a cascade of warning signals on the basis of a hazard level of the driving situation brought about by the detected object and/or by the vehicle. The warning signals can be for example visible signals with respective different colors and/or audible signals with respective different sounds and/or sound sequences.

A cascade of warning signals can in this case include for example colors of a visible signal that are dependent on the hazard level and/or an audible signal that is dependent on the hazard level. By way of example, the warning device can generate a visible green warning signal when there is a negligible hazard level, a visible yellow warning signal when there is a low hazard level, a visible red visible warning signal when there is a medium hazard level and a visible red signal and additionally an audible signal when there is a high hazard level. It is also possible for the frequency and/or sound sequence of the audible signal to be varied on the basis of the hazard level.

A second aspect of the invention sets out from an apparatus for warning a vehicle driver of a vehicle about an object, containing at least the following:
  a) a sensor device having a detection area, wherein the sensor device can detect an object stationary or moving within the detection area,
  b) a control device interacting with the sensor device and configured so that it evaluates the signals of the sensor device for objects stationary or moving within the detection area and defines a warning area that is dynamically alterable at least on the basis of speed, said warning area being smaller than the detection area or no more than the same size as the detection area,
  c) a warning device actuated by the control device such that it generates a warning signal to warn the vehicle driver, wherein
  d) the warning device is configured so that it generates a cascade of warning signals on the basis of a hazard level of the driving situation brought about by the detected object and by the vehicle.

According to the second aspect, there is provision, according to the invention, that
  e) the control device is furthermore configured so that, on detection of an object moving along an object trajectory in a manner laterally offset from the vehicle, in particular from a longitudinal centerline of the vehicle, and in particular parallel to the longitudinal centerline of the vehicle, within the detection area, it defines a hazard area, wherein
    e1) the definition of the hazard area is based on the hypothetical situation that the vehicle turns in the direction of the object trajectory which may be in each calculation step and it comes to a fictitious point of intersection between the then fictitious vehicle trajectory and the object trajectory, and wherein
    e2) the hazard area is in triangular form, with a first corner point, arranged on the vehicle, as a reference point, a second corner point arranged on the object trajectory and a third corner point arranged on the object trajectory, wherein the second corner point and the third corner point are defined such that a collision between the object and the vehicle is assumed if the object is on the object trajectory on the connecting line between the second corner point and the third corner point at the particular time, otherwise no collision is assumed, and that
  f) the control device is furthermore configured so that it then takes a detection of an object within or outside the warning area and within or outside the hazard area as a basis for generating a warning signal corresponding to the respective existing hazard level at that time within the cascade of warning signals.

In particular, the control device is configured so that, if the sensor device
  f1) detects an object outside the warning area and outside the hazard area but within the detection area, it generates a first warning signal or does not generate a warning signal, or
  f2) detects an object within the hazard area and within the warning area or outside the warning area, it generates a second warning signal, or
  f3) detects an object outside the warning area but within the hazard area and that the vehicle and the object are moving relative to one another, or detects an object within the warning area and within the hazard area and that the vehicle and the object are not moving relative to one another, it generates a third warning signal, or f4) detects an object within the warning area and within the hazard area and that the vehicle and the object are moving relative to one another, it generates a fourth warning signal, wherein g) the hazard level rises from the first warning signal to the fourth warning signal.

By combining generation of a warning area that is dynamically adaptable at least on the basis of speed and a hazard area based on a specific object detection situation by the control device, the warning area is firstly kept as small as possible in order to avoid an excessive number and frequency of warning signals, as already mentioned above. Secondly, the hazard area allows an assessment of a specific object detection situation in relation to a possible collision. The warning area and the hazard area are in particular mutually independent areas and can, but do not have to, intersect or overlap. In respect of the hazard area, the control device is thus configured so that it makes a prediction, at any time on the journey by the vehicle, of whether or not fictitious turning of the vehicle in the direction of the object trajectory leads to a collision with a detected object. This makes the road safety attainable by the apparatus advantageously high overall, without the driver being distracted by excessively frequent and numerous warning signals.

The measures set out in the subclaims allow advantageous developments and improvements of the second aspect of the invention.

According to an embodiment of the second aspect, the control device is furthermore configured so that it defines the hazard area on the basis of time in time steps, at least on the basis of the object trajectory and/or the speed of the vehicle that currently exists at the respective time step. This matches the hazard area to the respective currently existing object trajectory of the object and takes into consideration any change in the object trajectory over time, e.g. changes of direction and/or speed of the object. Alternatively or additionally, a change in the speed of the vehicle is taken into consideration, while the direction of movement toward the object is prescribed to by the fictitious vehicle trajectory.

According to an development of the second aspect, the first corner point or reference point is a spot or an area on the vehicle in such a way at which at least one sensor of the sensor device is arranged that detects the object.

The control device can also be configured so that it defines the second corner point and the third corner point at least on the basis of a smallest possible or minimum radius that the vehicle traveling at a particular speed with an at the time can still travel on safely if it fictitiously turns in the direction of the object trajectory at a maximum possible transverse acceleration.

According to a development of the second aspect, the warning signals are visible signals with respective different colors and/or audible signals with respective different sounds and/or sound sequences.

The control device may define the detection area such that it extends at least from a front detection area, arranged in front of a vehicle front, including the front detection area, via a side detection area, arranged laterally from a vehicle side, to a rear detection area in front of a vehicle rear, including the rear detection area.

According to one development of the second aspect of the invention, the control device is configured so that the dynamically alterable warning area A_info is alterable between a non-zero minimum warning area A_info_min and a maximum warning area A_info_max within the side detection area, as seen perpendicular to a longitudinal centerline of the vehicle. In other words, the warning area is then altered only in a lateral direction, whereas it remains constant as seen in the direction of the longitudinal centerline of the vehicle.

According to one development of the second aspect of the invention, the control device is furthermore configured so that it expands the dynamically alterable warning area, as seen in the direction of the longitudinal centerline of the vehicle, into the rear detection area if the sensor device detects an object in the rear detection area, and/or expands it into the front detection area if the sensor device detects an object in the front detection area, if the sensor device detects that the vehicle and the object are moving toward one another.

In other words, the dynamically alterable warning area within which a warning signal is actually generable if an object is detected therein is widened into the front detection area and/or into the rear detection area of the detection area if necessary. The advantages of this approach have already been discussed in detail above in relation to the first aspect of the invention.

According to one development of the second aspect, the control device can be configured so that it can receive signals representing an actual or intended turning of the vehicle and laterally widens the dynamically alterable warning area, as seen transversely with respect to the longitudinal centerline of the vehicle, on that vehicle side within the side detection area toward which turning of the vehicle actually takes place or is intended. This also increases safety when the vehicle turns.

According to one development of the second aspect, the side detection area of the detection area is arranged laterally from the vehicle side that is the vehicle side facing away from a driver's seat of the vehicle. It is then possible to avoid critical situations particularly for left-hand control vehicles when turning right. Alternatively, the side detection area of the detection area can also be arranged laterally from the vehicle side that is the vehicle side facing the driver's seat of the vehicle. In this case, it is possible to avoid critical situations particularly when turning left.

The dynamically alterable warning area may become smaller as the speed of the vehicle decreases, with a minimum warning area being a lower limit. The background is that at a relatively low speed e.g. in city traffic and given a relatively large warning area owing to the numerous objects normally present e.g. at a junction, a correspondingly large number of warning signals would be generated that would overwhelm the vehicle driver. A warning area that is then smaller then ensures that the number of warning signals is advantageously reduced. Conversely, the dynamically alterable warning area becomes larger as the speed of the vehicle increases, a maximum warning area e.g. in the form of the detection area being an upper limit.

The invention also relates to a vehicle provided with an apparatus according to the first aspect or according to the second aspect of the invention.

Exemplary embodiments of the invention are depicted below in the drawing and explained in more detail in the description that follows.

DETAILED DESCRIPTION

Figure 1:
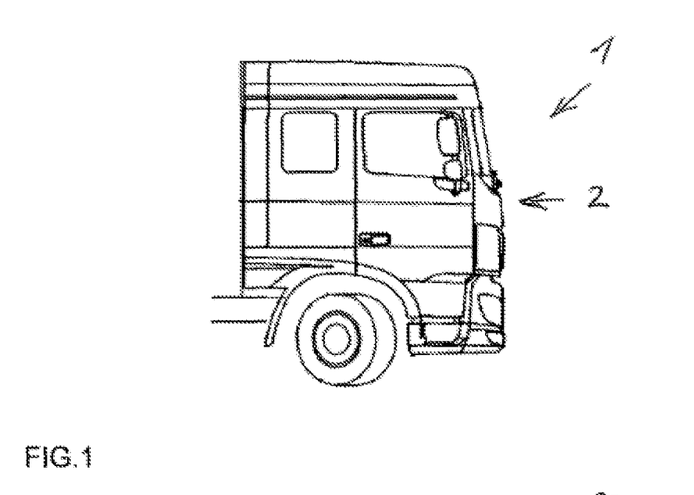
FIG. 1 shows a front portion of a side view of a vehicle having an apparatus for warning a vehicle driver of a vehicle about an object according to an embodiment of the invention.

FIG. 1 shows a front portion of a side view of an, in this case, by way of example, left-hand drive vehicle 1, in particular a towing vehicle of a towing-vehicle/trailer combination, having an apparatus 2 for warning a vehicle driver of the vehicle about an object 4 according to an embodiment of the invention.

The apparatus 2 contains a sensor device 6 having a detection area 8 extending at least from a front detection area 12, arranged in front of a vehicle front 10, to a side detection area 16, arranged laterally from an, in this case, by way of example, right-hand vehicle side 14. Furthermore, the detection area 8 also comprises a rear detection area 18 behind the vehicle rear 20, extending from a rear end of the side detection area 16 to an end of the rear detection area 18 pointing away from the side detection area 16. (FIG. 2).

The detection area 8 is in this case depicted rectangularly in an idealized manner, but can have any shape depending on the type of the sensor device 6. The sensor device 6 can detect an object 4 stationary or moving within the detection area 8 and also the speed v_target at which this object moves and in which direction.

Figure 2:
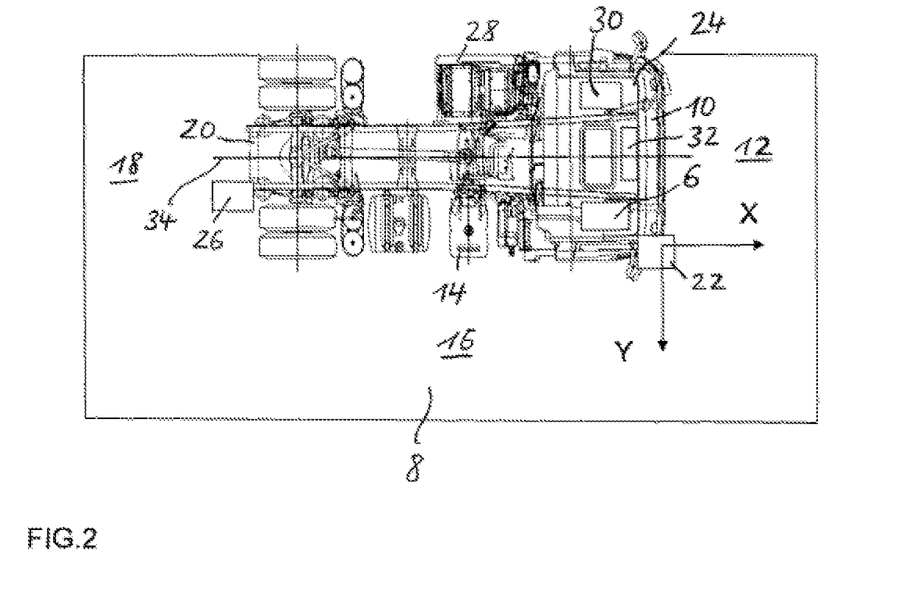
FIG. 2 shows a plan view of the vehicle from FIG. 1 with a symbolically depicted detection area of a sensor device of the apparatus.

In FIG. 1 and FIG. 2, it is possible to see, from the sensor device 6, a first sensor 22 on the right-hand front edge of a driver's cab 24 and a second sensor 26 at the rear end of a longitudinal frame support, on the right in the direction of travel, of a ladder frame of the towing vehicle. Beyond that, the sensor device 6 can also include further sensors that then widen the detection area 8, for example also to the other side detection area on the other vehicle side 28. The sensor or sensors is/are for example radar sensors, laser sensors or else cameras.

Furthermore, the apparatus 2 also includes a control device 30, interacting with the sensor device 6, that is configured so that it evaluates the signals of the sensor device 6 for whether an object 4 and/or what type of object 4 (stationary or moving) is situated within the detection area 8 and in which direction this object 4 moves. Outside the detection area 8, no detection of objects 4 is meant to be possible.

Figure 3:
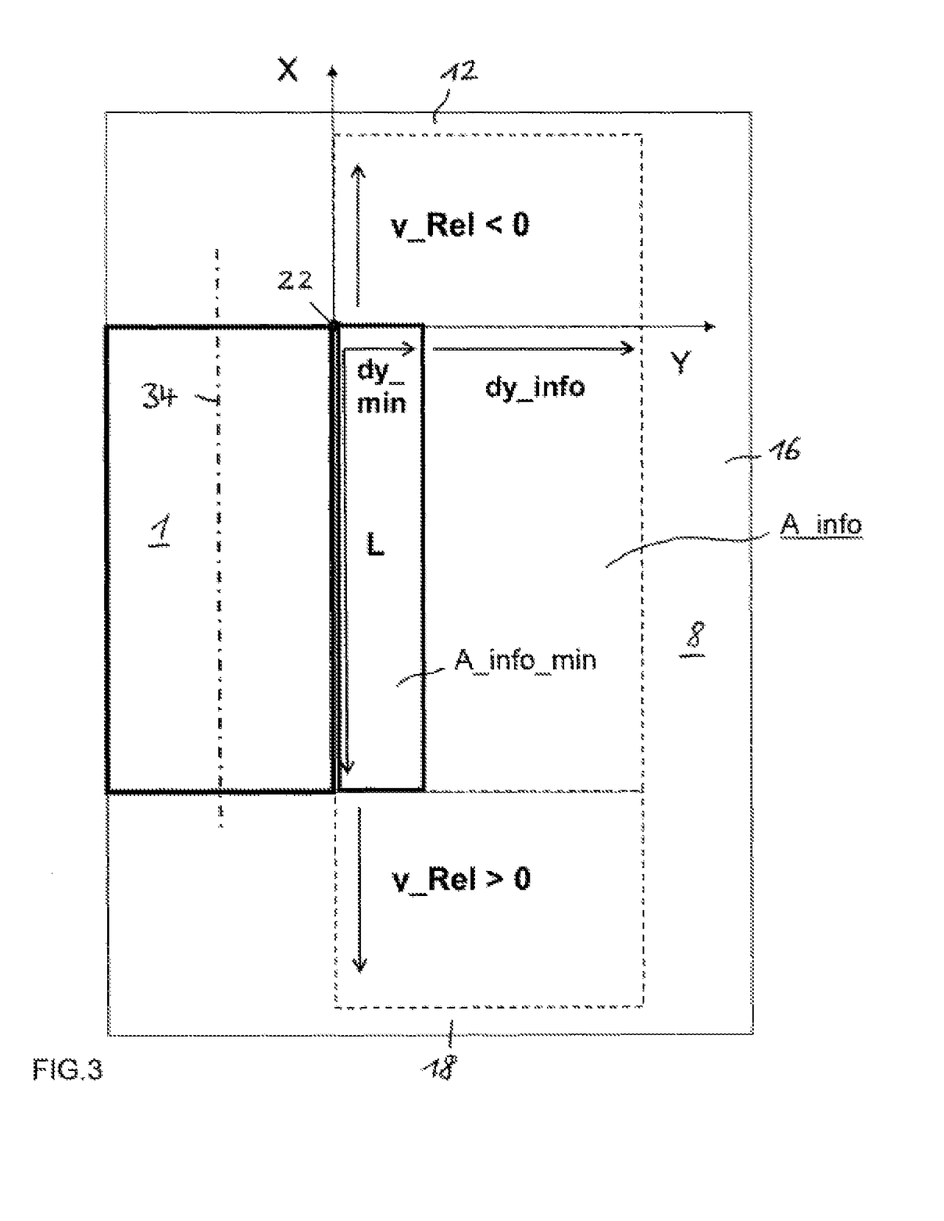
FIG. 3 shows a highly schematized plan view of the vehicle from FIG. 1 with a symbolically depicted dynamically alterable warning area of the apparatus.

The control device 30 is also configured so that it defines a warning area A_info, depicted in a dashed line in FIG. 3, that is dynamically alterable on the basis of the speed v_ego of the vehicle 1. Dynamically alterable warning area A_info means that the outer limits or edges of the warning area A_info are alterable. The dynamically alterable warning area A_Info is always smaller than or the same as the detection area 8, i.e. it cannot generally be larger than the detection area 8. The dynamically alterable warning area A_info is defined or calculated by the control device 30 on the basis of the speed v_ego of the vehicle 1.

The dynamically alterable warning area A_info may become smaller as the speed of the vehicle decreases, the minimum warning area A_info_min being a lower limit. The background is that at a relatively low speed e.g. in city traffic and given a relatively large warning area A_info owing to the numerous objects normally present e.g. at a junction, a correspondingly large number of warning signals would be generated that would overwhelm the vehicle driver. A warning area A_info that is then smaller then ensures that the number of warning signals is advantageously reduced. Conversely, the dynamically alterable warning area A_info becomes larger as the speed of the vehicle increases, with the maximum warning area e.g. in the form of the detection area 8 being an upper limit.

Furthermore, the apparatus 2 also has a warning device 32 that is actuated by the control device such that it generates a warning signal to warn the vehicle driver only if the sensor device detects an object in the dynamically variable warning area.

FIG. 3 shows a highly schematized plan view of the vehicle from FIG. 1 with the dynamically alterable warning area A_info depicted symbolically therein by rectangles drawn in dashed lines. As FIG. 3 reveals, the warning area A_info is firstly alterable between the non-zero minimum warning area A_info_min and a maximum warning area A_info_max within the side detection area 8, as seen perpendicular to a longitudinal centerline 34 of the vehicle. The length of the minimum warning area A_info_min is in this case identical to the length L of the vehicle 1, for example, and is congruent therewith. The width of the minimum warning area A_info_min is dy_min in FIG. 3.

Furthermore, the warning area A_info can also expand into the rear detection area 18, as seen in the direction of the longitudinal centerline 34 of the vehicle 1, if the sensor device 6 detects an object 4 in the rear detection area 18, for example a cyclist riding a bicycle who is moving from the rear right toward the vehicle 1 and parallel thereto. In that case, for example, the speed v_target of the cyclist 4 is greater than the speed v_ego of the vehicle 1, e.g. because the vehicle 1 is stationary at a junction and the cyclist 4 is traveling from the rear right toward the vehicle 1, for example in order to come to a standstill beside the, in FIG. 3, right-hand vehicle side 14 of the vehicle 1. This situation is characterized by v_Rel>0 in FIG. 3, because it is then assumed that the relative speed v_Rel or the difference between the speed v_target of the object 4 and the speed v_ego of the vehicle 1 is greater than 0. The widening of the warning area A_info into the rear detection area 18 that is then prompted by the control device 30 as a result is depicted in the lower portion of FIG. 3.

Furthermore, the dynamically alterable warning area A_info can also expand into the front detection area 12 of the detection area 8 if the sensor device 6 detects an object 4 in the front detection area 12, for example again a cyclist riding a bicycle who is moving from the front right in front of the vehicle 1 and for example parallel thereto. Since for example the speed v_target of the cyclist is less than the speed v_ego of the vehicle, the cyclist 4 is moving toward the vehicle more or less from in front. This situation is characterized by v_Rel<0 in FIG. 3, because it is then assumed that the relative speed or the difference between the speed v_ego of the vehicle and the speed v_target of the object is less than 0. The widening of the dynamically alterable warning area A_info into the front detection area 12 that is then prompted by the control device 30 as a result is depicted in the upper portion of FIG. 3.

FIG. 2 and FIG. 3 furthermore depict a coordinate system X-Y with the zero point at the right-hand front edge of the vehicle 1, the Y direction (positive values starting from the zero point to the right) running perpendicular to the longitudinal centerline 34 of the vehicle 1 and the X direction (positive values starting from the zero point to the front, negative values starting from the zero point to the rear) running parallel to the longitudinal centerline 34 of the vehicle 1.

Starting from the zero point each time, dy_info denotes the width of the dynamically alterable warning area A_info in the Y direction, dy_min denotes the minimum width of the minimum warning area A_info_min in the Y direction, v_ego denotes the speed of the vehicle and vy_Rel denotes the relative speed between the detected object 4 and the vehicle 1 in the Y direction.

The following is then true of the surface area of the minimum warning area A_Info_min laterally from the vehicle 1 (right-hand side in this case):

$$A\_Info\_min = dy\_min * l\_truck \quad (1)$$

where l_truck is the length L of the vehicle 1 or of the vehicle/trailer combination.

Furthermore, the following is true of the width dy_info of the dynamically alterable warning area A_info on the basis of the relative speed vy_Rel in the Y direction:

$$dy\_info = dy\_min + coeff\_vx1 * v\_ego^2 + coeff\_vx2 * v\_ego + coeff\_vy * vy\_rel \quad (2)$$

where coeff_vx1, coeff_vx2 and coeff_vy are coefficients that are dependent on the vehicle speed v_ego in X and Y directions and on the geometry of the vehicle 1.

If there is a relative movement between the vehicle 1 and the detected object 4 in the rear detection area 18 behind, the following is true, as already explained above:

$$v\_Rel > 0 \quad (3)$$

In that case, the following is true of the change dx_max in the length L of the warning area A_info starting from the zero point toward the front:

$$dx\_max = 0 \quad (4)$$

In other words, no lengthening dx_max of the warning area A_info toward the front is then necessary because an object 4 is not approaching the vehicle 1 from the front or an object 4 has not been detected in front of the vehicle 1.

By contrast, the following is then true of the change dx_min in the length of the warning area A_info starting from the zero point to the rear:

$$dx\_min = -l\_truck - coeff\_vRel * vRel \quad (5)$$

where l_truck is the length L of the vehicle 1 or of the vehicle train and coeff_vRel is a constant coefficient.

In other words, a lengthening dx_min of the warning area A_info toward the rear is then necessary because an object 4 is approaching the vehicle 1 from behind.

If there is a relative movement between the vehicle 1 and the detected object 4 in the front detection area 12 in front, the following is true, as already explained above:

$$v\_Rel < 0 \quad (6)$$

The following is then true of the change dx_max in the length of the warning area A_info starting from the zero point toward the front:

$$dx\_max = -coeff\_vRel * vRel \quad (7)$$

where coeff_vRel is a constant coefficient.

The following is then true of the change dx_min in the length of the warning area A_info starting from the zero point toward the rear:

$$dx\_min = -l\_truck \quad (8)$$

Consequently, the warning area A_info is not lengthened toward the rear because an object 4 has not been detected there.

Accordingly, it is also possible to take into consideration situations in which objects 4 move substantially in the same direction as the vehicle 1, i.e. the trajectory of the objects 4 is parallel to the longitudinal centerline 34 of the vehicle 1 and the objects 4 are situated, in relation to the longitudinal centerline 34 of the vehicle 1, not just laterally from the vehicle 1 but rather additionally also either in front of or behind the vehicle 1, i.e. in front of the vehicle front 10 or behind the vehicle rear 20; furthermore, also situations in which the object 4 is stationary and the traveling vehicle 1 moves toward the object 4 from in front or behind.

The widening of the dynamically alterable warning area A_info in the front and/or rear area of the vehicle 1 warns the driver, by warning signals, about objects 4 approaching the vehicle 1 from behind or from in front, relative to the vehicle 1, but not yet situated in the dynamically alterable warning area A_info arranged within the side detection area 16, but being expected to be there soon, before his actual intended turning in the direction of the monitored vehicle side 14 of the vehicle 1. The reason is that specifically such objects 4 carry the risk of being overlooked by the driver when the vehicle 1 turns, in this case right, and a collision then occurring.

The dynamically alterable warning area A_info may become smaller as the speed v_ego of the vehicle 1 decreases, with the minimum warning area A_Info_min being a lower limit. Conversely, which may be the dynamically alterable warning area A_info becomes larger as the speed v_ego of the vehicle 1 increases, with the maximum warning area A_Info_max e.g. in the form of the detection area 8 being an upper limit.

The control device 30 may be configured so that it can receive signals representing an actual or intended turning of the vehicle 1 and laterally widens the dynamically alterable warning area A_info, as seen transversely with respect to the direction of travel (X-direction) or the longitudinal centerline 34 of the vehicle 1, on the vehicle side 14 toward which the turning of the vehicle 1 actually takes place or is intended. These signals can come for example from operation of a direction of travel indicator (turn signal) and/or a steering wheel angle sensor that senses a rotational movement of the steering wheel. The side detection area 16 of the detection area 8 may be arranged on the outside laterally from the vehicle side 14 that is the vehicle side facing away from a driver's seat of the vehicle. It is then possible to avoid critical situations particularly for left-hand control vehicles 1 when turning right. Alternatively, the side detection area 16 of the detection area 8 can also be arranged laterally from the other vehicle side 28, which is the vehicle side facing the driver's seat of the vehicle. In this case, it is possible to avoid critical situations particularly for right-hand control vehicles 1 when turning left.

The above measures naturally also apply to right-hand drive vehicles, with the sides transposed each time.

The warning device 32 may be configured so that it generates a cascade of warning signals on the basis of a hazard level of the driving situation brought about by the detected object 4 and/or by the vehicle 1. The warning signals can be for example visible signals with respective different colors and/or audible signals with respective different sounds and/or sound sequences.

A cascade of warning signals can in this case include for example colors of a visible signal that are dependent on the hazard level and/or an audible signal that is dependent on the hazard level. By way of example, the warning device can generate a visible green warning signal when there is a negligible hazard level, a visible yellow warning signal when there is a low hazard level, a visible red visible warning signal when there is a medium hazard level and a visible red signal and additionally an audible signal when there is a high hazard level. It is also possible for the frequency and/or sound sequence of the audible signal to be varied on the basis of the hazard level.

Figure 4:
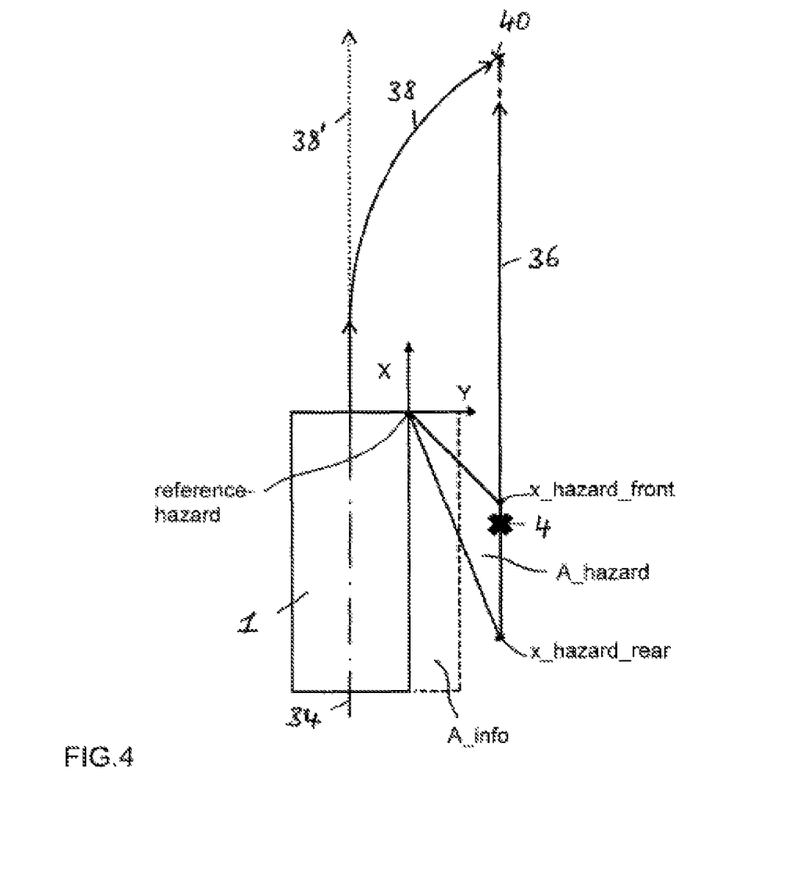
FIG. 4 shows a highly schematized plan view of the vehicle from FIG. 1 with a symbolically depicted dynamically alterable warning area and a symbolically depicted hazard area of the apparatus.

FIG. 4 shows a highly schematized plan view of the vehicle 1 from FIG. 1 with a symbolically depicted dynamically alterable warning area A_info as has already been described above. Additionally, a hazard area A_hazard is symbolically depicted in this case.

As in FIG. 3, FIG. 4 also depicts a coordinate system X-Y with the zero point at the for example right-hand front edge of the vehicle 1, the Y direction (positive values starting from the zero point to the right) running perpendicular to the longitudinal centerline 34 of the vehicle 1 and the X direction (positive values starting from the zero point to the front, negative values starting from the zero point to the rear) running parallel to the longitudinal centerline 34 of the vehicle 1.

As in the exemplary embodiment described previously, the warning area A_info is, in this case too, meant to be dynamically variable at least on the basis of the speed v_ego of the vehicle, with the warning area A_info likewise becoming larger, starting from a minimum warning area A_info_min, as the speed v_ego increases.

A first arrow in FIG. 4 symbolizes the object trajectory 36 of an object 4, for example a cyclist, that is moving to the right of the vehicle 1 at a speed v_target and is detected within the detection area 8 by the sensor device 6. The object 4 in FIG. 4 thus moves along the object trajectory 36 for example approximately parallel to the vehicle 1, but in a manner laterally offset therefrom, in relation to the longitudinal centerline 34 of the vehicle 1. A second arrow in FIG. 4 symbolizes the vehicle trajectory 38 of the vehicle, which is hypothetically or fictitiously assumed to turn right at a particular time t0.

The control device 30 is then configured so that, on detection of the object 4, it defines the hazard area A_hazard, the hazard area A_hazard being based on the hypothetical or fictitious situation in which the vehicle 1 turns in the direction of object trajectory 36 at the time t0 such that the then fictitious vehicle trajectory 38 and the object trajectory 36 intersect at a fictitious point of intersection 40. The actual vehicle trajectory 38' continued from the time t0 of the fictitious turning is denoted by a dotted line in FIG. 4.

The vehicle trajectory 38, 38' and the object trajectory 36 are set for example in relation to an X-Y coordinate system that has its origin for example at the location of the arrangement of the first sensor 22 of the sensor device 6 on the vehicle 1, namely at the edge between the vehicle front 10 and the right-hand vehicle side at the front right.

Other positions for the origin of the coordinate system are also conceivable, however. Consequently, the object trajectory 36 is substantially parallel to the X direction of the X-Y coordinate system in this case.

The hazard area A_hazard is in substantially triangular form, with a first corner point, arranged on the vehicle, as a reference point reference_hazard, a second corner point x_hazard_front arranged on the object trajectory and a third corner point x_hazard_rear arranged on the object trajectory. Since it is assumed in this case by way of example that the object 4, e.g. a cyclist, moves with its object trajectory 36 approximately parallel to the longitudinal centerline 34 of the vehicle 1 and thus parallel to the X direction, the front second corner point x_hazard_front and the rear third corner point x_hazard_rear differ only in their value in the X direction in this case, for example.

The first corner point or reference point referenz_hazard of the hazard area A_hazard is thus arranged on the vehicle 1 and may be determined by the position of the in this case first sensor 22 or of the sensors on the vehicle 1 that detect or have detected the object 4. In the present case, the first corner point referenz_hazard is thus for example the spot at which the first sensor 22 is defined on the vehicle 1 and then also detects the object 4. Detects means that the first sensor 22 detects at least the position of the object 4 in relation to the first sensor 22 or vehicle 1, the speed v_target of the object 4 and also the current direction of movement of the object 4, i.e. the respective current object trajectory 36, the object trajectory 36 naturally being able to change over time.

The second corner point x_hazard_front and the third corner point x_hazard_rear of the hazard area A_hazard are defined by the control device 30 such that calculations performed by the control device 30 are taken as a basis for assuming a collision between the object 4 and the vehicle 1 if the object 4 is on the object trajectory 36 on the connecting line between the second corner point x_hazard_front and the third corner point x_hazard_rear at the time t0, otherwise no collision is assumed. If the object is thus on the object trajectory 36 outside the connecting line between the second corner point x_hazard_front and the third corner point x_hazard_rear, it can be assumed that there is no risk of collision. This assessment is provided based on time in each case, however, because, as already explained above, the object trajectory 36 can change over time, in this case for example as a result of the object 4 turning in the direction of the vehicle or away from it.

The position of the second corner point x_hazard_front and the position of the third corner point x_hazard_rear of the hazard area A_hazard on the object trajectory 36, i.e. in this case for example parallel to the X direction, are then calculated as follows:

Based on the speed v_ego of the vehicle 1 and a maximum possible transverse acceleration a_max_lat of the vehicle 1 during its fictitious turning, a smallest possible radius r_min is determined that the vehicle 1 can still travel on safely. The control device 30 then uses the smallest possible or minimum radius r_min in order to calculate the different paths of movement of the wheels of the vehicle 1.

Together with the information about the intervention time, which is made up of the sum of the reaction time of the driver t_driver_react and the time t_system_delay+t_brake/2 that the brake system of the vehicle needs before a braking reaction takes place, the distance dx_intervention in the longitudinal direction or in the X direction before the vehicle 1 is stationary is then calculated as follows:

$$dx\_intervention = v\_ego*(t\_driver\_react + t\_system\_delay + t\_brake/2)) \quad (9)$$

This distance dx_intervention can then be quantified, as can the path of movement of the cyclist dx_target in the same direction, who is moving at the speed v_target:

$$dx\_target = v\_target*(t\_driver\_react + t\_system\_delay + t\_brake)) \quad (10)$$

The second front corner x_hazard_front of the hazard area A_hazard in the X direction is then the difference between the values calculated in formulae (9) and (10):

$$x\_hazard\_front = dx\_intervention - dx\_target \quad (11)$$

The third rear corner x_hazard_rear is calculated by deducting from the X value of the second front corner x_hazard_front the distance that the object 4 moving at the object speed v_target covers during the time t_cross that the vehicle 1 needs in order to reach the fictitious point of intersection 40 with the object trajectory 36 on the fictitious vehicle trajectory 38 of said vehicle and to which the distance dx_crossing_delta is added, which corresponds to the difference between the distance covered by the wheels of the front axle and the wheels of the rear axle of the vehicle 1, which is dependent on the wheelbase.

$$x\_hazard\_rear = x\_hazard\_front - t\_cross*v\_target + dx\_crossing\_delta \quad (12)$$

The warning area A_hazard may be not constant, but rather is defined or calculated afresh in each case on the basis of time, for example in discrete time steps, because in particular the object trajectory 36 can change over time. The control device 30 thus may define the warning area A_hazard on the basis of time in time steps, at least on the basis of the object trajectory 36 that currently exists at the respective time step, which object trajectory is determined at least by the object speed v_target prevailing at that time and the direction of movement of the object 4 prevailing at that time, and also on the basis of the vehicle speed v_ego, which can likewise change.

The control device 30 is thus configured so that it generates or defines the hazard area A_hazard fundamentally at least on the basis of the speed of the vehicle v_ego, the speed of a detected object v_obj, the relative speed between the vehicle 1 and the detected object v_Rel and the distance between the vehicle 1 and the detected object 4. In this case, the hazard area A_hazard is again smaller than the detection area 8 or no more than the size of the detection area 8.

The calculations cited above may be performed for all detected objects 4 in parallel, and only the most critical object 4 of the detected objects 4 is used to generate a warning signal.

Figure 5:
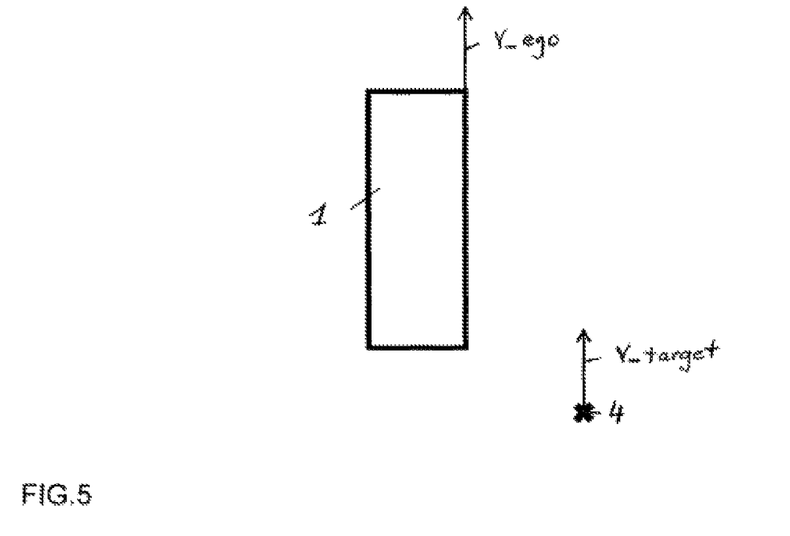
FIG. 5 shows a traffic situation between the vehicle from FIG. 1 and an object for which the apparatus generates a lowest level of warning signal.

The control device 30 is for example furthermore configured so that, if the sensor device 6 detects an object 4 moving e.g. in the direction of travel to the right behind the vehicle 1 outside the warning area A_info and outside the hazard area A_hazard but within the detection area 8, it generates a first warning signal. This situation is shown in FIG. 5. The first warning signal can consist for example in a visible green signal displayed on a display arranged in the driver's cab or in a cab of the vehicle 1. This first warning signal is then the lowest level of warning signal and thus actually not a warning signal in the narrow sense, because there is no need for a warning.

Figure 6:
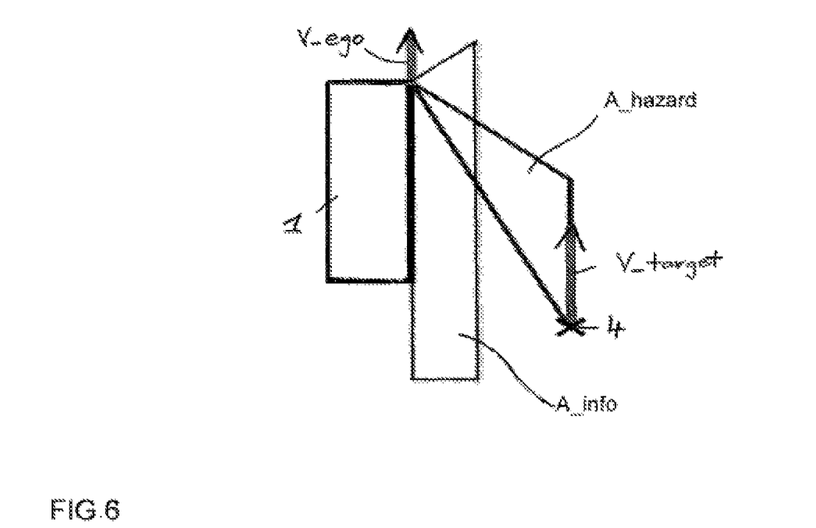
FIG. 6 shows a traffic situation between the vehicle from FIG. 1 and an object for which the apparatus generates a higher level of warning signal in comparison with the lowest level.

If an object 4 is detected within the warning area A_info, but outside the hazard area A_hazard, in the event of assumed fictitious turning of the vehicle 1 in the direction of an object 4, then a second warning signal is generated, which is the next highest level of warning signal in the warning signal cascade from the first warning signal, for example. The second warning signal can consist for example in a visible yellow signal that is displayed on the display. This situation is shown in FIG. 6.

Figure 7:
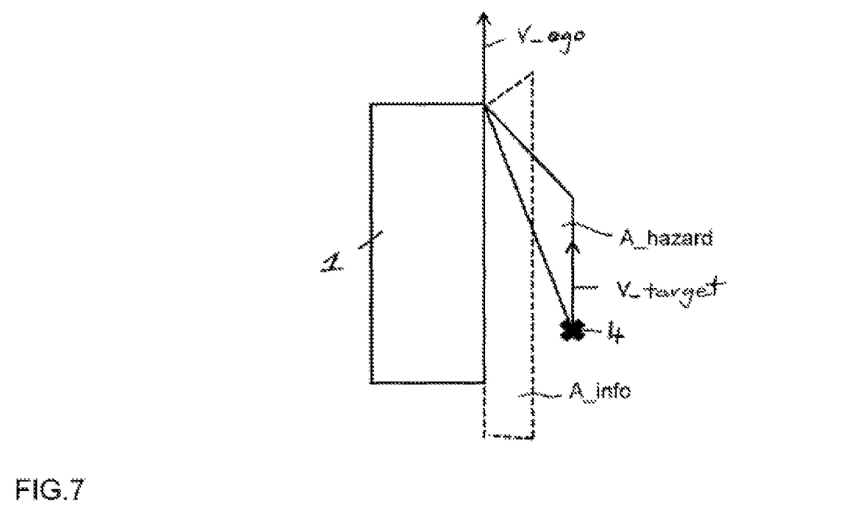
FIG. 7 shows a traffic situation between the vehicle from FIG. 1 and an object for which the apparatus generates a higher level of warning signal in comparison with the lowest level.

FIG. 7 shows a situation in which, in the event of assumed fictitious turning of the vehicle 1 in the direction of an object 4, the object 4 is within the hazard area A_hazard, but outside the warning area A_info. In that case, a the second warning signal is again generated in the form of the visible yellow signal and displayed on the display.

Figure 8:
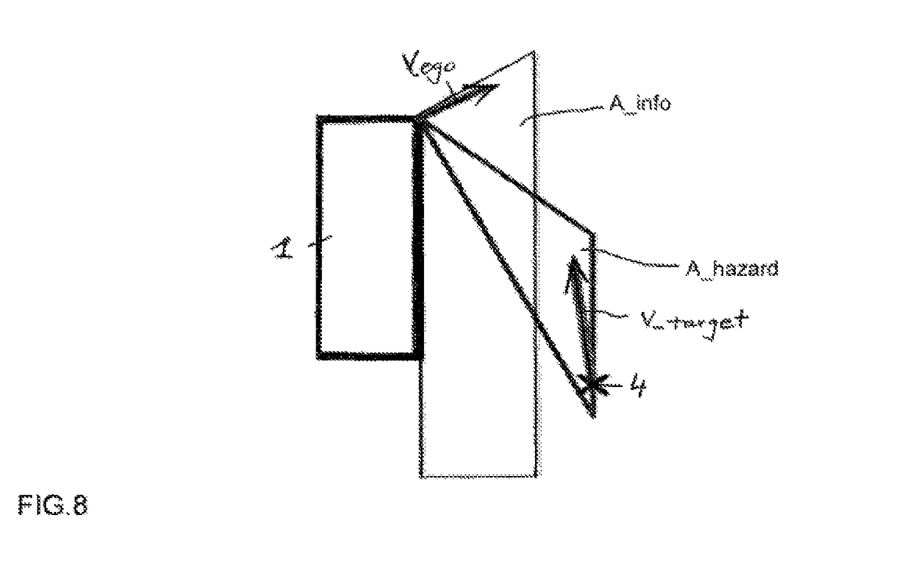
FIG. 8 shows a traffic situation between the vehicle from FIG. 1 and an object for which the apparatus generates a higher level of warning signal in comparison with the lowest level.

FIG. 8 shows a situation in which an object 4 outside the warning area A_Info but within the hazard area A_hazard, and also the vehicle 1 and the object 4 actually moving relative to one another, is detected, or expected (as a result of operation of the direction of travel indicator) movement in relation to one another by virtue of fictitious turning of the vehicle 1 in the direction of the object 4 is assumed. The relative movement is symbolized by the movement vectors of the vehicle 1 and the object 4, wherein the trajectories 36, 38 have a point of intersection, suggesting an imminent collision. A third warning signal for example in the form of a visible red warning signal is then generated on the display, said third warning signal being the next highest level of warning signal in the warning signal cascade from the second warning signal.

Figure 9:
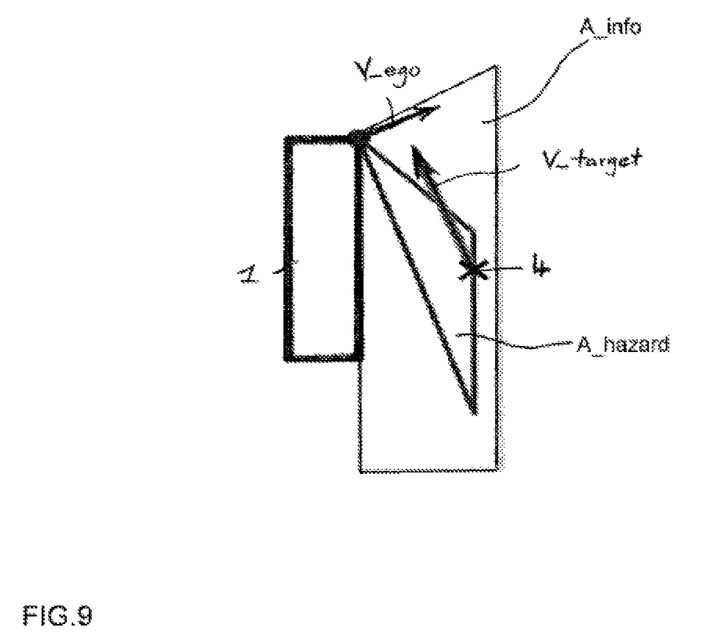
FIG. 9 shows a traffic situation between the vehicle from FIG. 1 and an object for which the apparatus generates a highest level of warning signal.

Finally, FIG. 9 shows a situation in which the object within the warning area A_info and within the hazard area A_hazard, and the vehicle 1 and the object 4 actually moving relative to one another, is detected, or expected (e.g. as a result of operation of the direction of travel indicator) movement in relation to one another by virtue of fictitious turning of the vehicle 1 in the direction of the object 4 is assumed. In this case too, the relative movement is symbolized by the movement vectors of the vehicle and the object, wherein the trajectories have a fictitious point of intersection, likewise suggesting an imminent collision. In that case, a fourth warning signal for example in the form of a visible red warning signal is generated on the display, and also an audible signal, for example, alongside this.

Generally, the hazard level thus rises from the first warning signal to the fourth warning signal in the warning signal cascade. Any visible and/or audible warning signals by which such a warning signal cascade is realizable are conceivable in this case.

The list of reference signs is as follows:
1 Vehicle
2 Apparatus
4 Object
6 Sensor device
8 Detection area
10 Vehicle front
12 Front detection area
14 Vehicle side
16 Side detection area
18 Rear detection area
20 Vehicle rear
22 First sensor
24 Driver's cab
26 Second sensor 28 Vehicle side
30 Control device
32 Warning device
34 Longitudinal centerline
36 Object trajectory
38, 38' Vehicle trajectory
40 Point of intersection

The invention claimed is:

1. An apparatus for warning a vehicle driver of a vehicle about an object, comprising:
   a) a sensor device having a detection area extending at least from a front detection area, arranged in front of a vehicle front, including the front detection area, to a rear end of a side detection area, arranged laterally from one vehicle side and whose length corresponds to no more than the length of the vehicle, wherein the sensor device detects an object stationary or moving within the detection area,
   b) a control device interacting with the sensor device and configured so that it evaluates the signals of the sensor device for objects stationary or moving within the detection area and defines a warning area that is dynamically alterable at least based on a speed of the vehicle, said warning area being alterable within the side detection area between a non-zero minimum warning area and a maximum warning area, as seen perpendicular to a longitudinal centerline of the vehicle, wherein the dynamically alterable warning area is smaller than or the same as the detection area,
   c) a warning device actuated by the control device such that it generates a warning signal to warn the vehicle driver only when the sensor device detects the object in the dynamically alterable warning area, wherein
   d) the sensor device is furthermore arranged and configured such that the detection area continues from the side detection area into a rear detection area behind the vehicle rear, including the rear detection area, and in that
   e) the control device is furthermore configured so that it expands the dynamically alterable warning area, as seen in the direction of the longitudinal centerline of the vehicle,
   e1) into the rear detection area if the sensor device detects the object in the rear detection area, and/or expands it into the front detection area if the sensor device detects the object in the front detection area, if
   e2) the sensor device detects that the vehicle and the object are moving toward one another.

2. The apparatus of claim 1, wherein the control device is configured so that it can receive signals representing an actual or intended turning of the vehicle and laterally widens the dynamically alterable warning area, as seen transversely with respect to the longitudinal centerline of the vehicle, within the side detection area on the vehicle side toward which the turning of the vehicle actually takes place or is intended.

3. The apparatus of claim 1, wherein the control device is configured so that it defines the dynamically alterable warning area based on the speed of the vehicle, the speed of the detected object, a relative speed between the vehicle and the detected object, a distance between the vehicle and the detected object and based on a geometry of the vehicle.

4. The apparatus of claim 1, wherein the side detection area of the detection area is arranged laterally from the vehicle side that is the vehicle side facing away from a driver's seat of the vehicle.

5. The apparatus of claim 1, wherein the side detection area of the detection area is arranged laterally from the vehicle side that is the vehicle side facing a driver's seat of the vehicle.

6. The apparatus of claim 1, wherein the warning device is configured so that it generates a cascade of warning signals based on a hazard level of a driving situation brought about by the detected object and/or by the vehicle.

7. The apparatus of claim 6, wherein the warning signals are visible signals with respective different colors and/or audible signals with respective different sounds and/or sound sequences.

8. An apparatus for warning a vehicle driver of a vehicle about an object, comprising:
   a) a sensor device having a detection area, wherein the sensor device can detect an object stationary or moving within the detection area,
   b) a control device interacting with the sensor device and configured so that it evaluates the signals of the sensor device for objects stationary or moving within the detection area and defines a warning area that is dynamically alterable at least on the basis of speed, said warning area being smaller than the detection area or no more than the same size as the detection area,
   c) a warning device actuated by the control device such that it generates a warning signal to warn the vehicle driver, wherein
   d) the warning device is configured so that it generates a cascade of warning signals based on a hazard level of a driving situation brought about by the detected object and/or by the vehicle,
   wherein
   e) the control device is furthermore configured so that, on detection of an object moving along an object trajectory in a manner laterally offset from the vehicle within the detection area, it defines a hazard area, wherein
   e1) the definition of the hazard area is based on the hypothetical situation that the vehicle turns in the direction of the object trajectory at a particular time and it comes to a fictitious point of intersection between the then fictitious vehicle trajectory and the object trajectory, and wherein
   e2) the hazard area is in triangular form, with a first corner point, arranged on the vehicle, as a reference point, a second corner point arranged on the object trajectory and a third corner point arranged on the object trajectory, wherein the second corner point and the third corner point are defined such that a collision between the object and the vehicle is assumed if the object is on the object trajectory on a connecting line between the second corner point and the third corner point at the particular time, otherwise no collision is assumed, and in that
   f) the control device is furthermore configured so that it takes a detection of an object within or outside the warning area and within or outside the hazard area as a basis for determining an existing hazard level and generates a warning signal corresponding to the respective hazard level within the cascade of warning signals.

9. The apparatus of claim 8, wherein the control device is furthermore configured so that, if the sensor device
   f1) detects the object outside the warning area and outside the hazard area but within the detection area, it generates a first warning signal or does not generate a warning signal, or f2) detects the object within the hazard area and outside the warning area or within the warning area and outside the hazard area, it generates a second warning signal, or f3) detects the object outside the warning area but within the hazard area and that the vehicle and the object are moving relative to one another, or detects the object within the warning area and the hazard area and that the vehicle and the object are not moving relative to one another, it generates a third warning signal, or f4) detects the object within the warning area and within the hazard area and that the vehicle and that the object are moving relative to one another, it generates a fourth warning signal, wherein g) the hazard level rises from the first warning signal to the fourth warning signal.

10. The apparatus of claim 8, wherein the control device is furthermore configured so that it defines the hazard area based on time in time steps, at least based on the object trajectory and/or the speed of the vehicle that currently exists at the respective time step.

11. The apparatus of claim 8, wherein the first corner point or reference point is a spot or an area on the vehicle at which at least one sensor of the sensor device is arranged that detects the object.

12. The apparatus of claim 8, wherein the control device is configured so that it defines the second corner point and the third corner point at least based on a smallest possible radius that the with a vehicle 1 traveling at a particular speed at the time can still travel on safely if it fictitiously turns in the direction of the object trajectory at a maximum possible transverse acceleration.

13. The apparatus of claim 8, wherein the warning signals are visible signals with respective different colors and/or audible signals with respective different sounds and/or sound sequences.

14. The apparatus of claim 8, wherein the control device defines the detection area such that it extends at least from a front detection area, arranged in front of a vehicle front, including the front detection area, via a side detection area, arranged laterally from a vehicle side, to a rear detection area in front of a vehicle rear, including the rear detection area.

15. The apparatus of claim 14, wherein the warning area is alterable within the side detection area between a non-zero minimum warning area and a maximum warning area, as seen perpendicular to a longitudinal centerline of the vehicle.

16. The apparatus of claim 14, wherein the warning area is dynamically alterable in a direction of the longitudinal centerline of the vehicle within the rear detection area and/or within the front detection area.

17. The apparatus of claim 14, wherein the control device is configured so that it can receive signals representing an actual or intended turning of the vehicle and laterally widens the dynamically alterable warning area, as seen transversely with respect to the longitudinal centerline of the vehicle, on that vehicle side within the side detection area toward which turning of the vehicle actually takes place or is intended.

18. The apparatus of claim 14, wherein the side detection area of the detection area is arranged laterally from the vehicle side that is the vehicle side facing away from a driver's seat of the vehicle.

19. The apparatus of claim 14, wherein the side detection area of the detection area is arranged laterally from the vehicle side that is the vehicle side facing the driver's seat of the vehicle.

20. A vehicle, comprising:
an apparatus for warning a vehicle driver of a vehicle about an object, including:
a) a sensor device having a detection area extending at least from a front detection area, arranged in front of a vehicle front, including the front detection area, to a rear end of a side detection area, arranged laterally from one vehicle side and whose length corresponds to no more than the length of the vehicle, wherein the sensor device detects an object stationary or moving within the detection area,
b) a control device interacting with the sensor device and configured so that it evaluates the signals of the sensor device for objects stationary or moving within the detection area and defines a warning area that is dynamically alterable at least based on a speed of the vehicle, said warning area being alterable within the side detection area between a non-zero minimum warning area and a maximum warning area, as seen perpendicular to a longitudinal centerline of the vehicle, wherein the dynamically alterable warning area is smaller than or the same as the detection area,
c) a warning device actuated by the control device such that it generates a warning signal to warn the vehicle driver only when the sensor device detects the object in the dynamically alterable warning area, wherein
d) the sensor device is furthermore arranged and configured such that the detection area continues from the side detection area into a rear detection area behind the vehicle rear, including the rear detection area, and in that
e) the control device is furthermore configured so that it expands the dynamically alterable warning area, as seen in the direction of the longitudinal centerline of the vehicle,
e1) into the rear detection area if the sensor device detects the object in the rear detection area, and/or expands it into the front detection area if the sensor device detects the object in the front detection area, if
e2) the sensor device detects that the vehicle and the object are moving toward one another.

* * * * *